United States Patent [19]
Tobin, III

[11] 3,840,402
[45] *Oct. 8, 1974

[54] METHOD FOR CLEANING AND INSPECTION OF CANISTER TYPE AIR FILTERS

[76] Inventor: Benjamin F. Tobin, III, P.O. Box 1005, Cupertino, Calif. 95014

[ * ] Notice: The portion of the term of this patent subsequent to Sept. 26, 1989, has been disclaimed.

[22] Filed: Feb. 3, 1972

[21] Appl. No.: 223,208

Related U.S. Application Data

[60] Continuation-in-part of Ser. No. 108,139, Jan. 20, 1971, Pat. No. 3,693,406, which is a division of Ser. No. 5546, Jan. 26, 1970, Pat. No. 3,606,897.

[52] U.S. Cl..................... 134/29, 134/33, 134/34
[51] Int. Cl...................... B08b 3/02, B08b 11/00
[58] Field of Search ................. 134/29, 33, 34, 21

[56] References Cited
UNITED STATES PATENTS

| | | | |
|---|---|---|---|
| 2,178,701 | 11/1939 | Petre | 134/33 |
| 2,699,793 | 1/1955 | Buck et al. | 134/33 UX |
| 3,216,429 | 11/1965 | Dick | 134/102 |
| 3,442,273 | 5/1969 | Hanish et al. | 134/170 X |
| 3,526,237 | 9/1970 | Neill | 134/33 X |
| 3,608,567 | 9/1971 | Neill | 134/33 X |
| 3,688,780 | 9/1972 | Everroad | 134/21 |

Primary Examiner—Morris O. Wolk
Assistant Examiner—Timothy W. Hagan
Attorney, Agent, or Firm—Christie, Parker & Hale

[57] ABSTRACT

This apparatus washes hollow cylindrical engine air cleaners or filter elements on inside and outside surfaces simultaneously. In one embodiment a pair of washing stations are provided, each with a turntable on which the filter is rotated. Spray nozzles inside and outside the filter element wash the filter and as it rotates, the sprays move along the length of the filter for washing the entire length of the filter. An aerated flow of water onto the filter membrane forces water through a sound membrane, and a mixture of water and air bubbles through a membrane with a tear or hole to provide a leak test. An inexpensive aerating nozzle is provided. In another embodiment cleaning and pressure, flow, and leak testing are all performed by successive soaping, rinsing and pressure testing with aerated water. Apparatus for cleaning and inspecting filters having several filter elements is provided.

9 Claims, 9 Drawing Figures

FIG_1

FIG_4

METHOD FOR CLEANING AND INSPECTION OF CANISTER TYPE AIR FILTERS

This is a continuation-in-part of application Ser. No. 108,139 filed Jan. 20, 1971, and now Pat. No. 3,693,406 issued Sept. 26, 1972, which is a division of application Ser. No. 5546 filed Jan. 26, 1970, and now Pat. No. 3,606,897 issued Sept. 21, 1971.

BACKGROUND

Heavy trucks, earthmovers and similar off-the-road equipment customarily include a large air filter for removing dust from the air intake to the engine, thereby protecting the engine. Such air cleaners commonly involve canisters in which a pleated paper air filter element is positioned so that the intake air to the engine is passed through the porous paper of the filter. Any dirt, grit or other foreign material is caught by the filter while the air passes so that it is prevented from entering the engine. When these filters have accumulated a substantial layer of dust, dirt and other debris, sometimes including oily material, they are removed from the canister and either discarded or cleaned.

In recent years, such cylindrical pleated paper filters have been made of resin impregnated paper which can be washed in order to remove accumulated dirt and debris so that the filter element can be reused many times, thereby effecting a very substantial cost saving without significantly decreasing the filtering efficiency of the air filter. Manual washing of the air filters involves a substantial amount of labor and is not customarily economical. Mechanical devices have been devised for cleaning filters; however, these have not proved satisfactory since they do not adequately clean the filters and manual finishing is usually required. In the best known apparatus for washing filters, approximately 40 filter elements per day could be washed sufficiently for reuse. Any substantial increase in the speed of cleaning with as good or better performance than existing machinery would substantially reduce the cost of cleaning and enhance the desirability of cleaning rather than discarding used air filter elements.

Inspection of cleaned air filters is also important to assure that no holes or tears are present in the filter paper that would permit dust particles to pass through and damage the engine. It is not only important to have thorough inspection with high reliability, but also it is desirable to provide the inspection at an early stage of the cleaning operation if possible to minimize the extent of cleaning given to a filter that is defective and need be discarded. Previously it has been the practice to clean the filter completely prior to inspection.

Although a large proportion of heavy equipment employs canister-type air filters having a fluted membrane of paper in the general form of a cylinder, another type is also employed that has, to date, completely resisted efforts to clean. This type of filter has a pair of rigid headers between which cylindrical pleated paper filter elements are arranged. Holes through one header provide access to the interior of each of the filter paper tubes and the other end is closed. These filters are typically rectangular and have from four to sixty-four tubes in commercially available embodiments. In such embodiments the hole through the header leading to the interior of the tubes is in the order of one inch diameter making it quite difficult to introduce a suitable washing nozzle. Access to the outside of the tubes is restricted since the adjacent elements prevent access to the elements from all sides. It is therefore desirable to provide a technique for cleaning and inspecting such filters, preferably by means of automatic or semi-automatic equipment.

With the best washing techniques previously available, it has been found that only a limited number of cleaning cycles can be performed on a filter before its ability to pass air is significantly diminished. Typically, after three or four washing operations the ability of the filter to pass air is diminished to the extent that it can no longer be used and must be discarded. It is therefore desirable to provide an improved washing technique that does not significantly diminish the air passing characteristics of an air filter.

BRIEF SUMMARY OF THE INVENTION

Thus, in practice of this invention according to a preferred embodiment, there are provided methods and apparatus for forcing a cleaning liquid through an air filter membrane. The cleaning liquid may be aerated soapy water for cleaning and inspection or aerated clear water following soaking of the filter in soapy water. Fluid may be forced through with a forcefully directed aerating nozzle or by "pressurizing" an entire filter element with aerated liquid.

DRAWINGS

Other features and advantages of the present invention will be apparent from the following detailed description of a presently preferred embodiment when considered in connection with the accompanying drawings wherein.

DESCRIPTION

Figure 1:
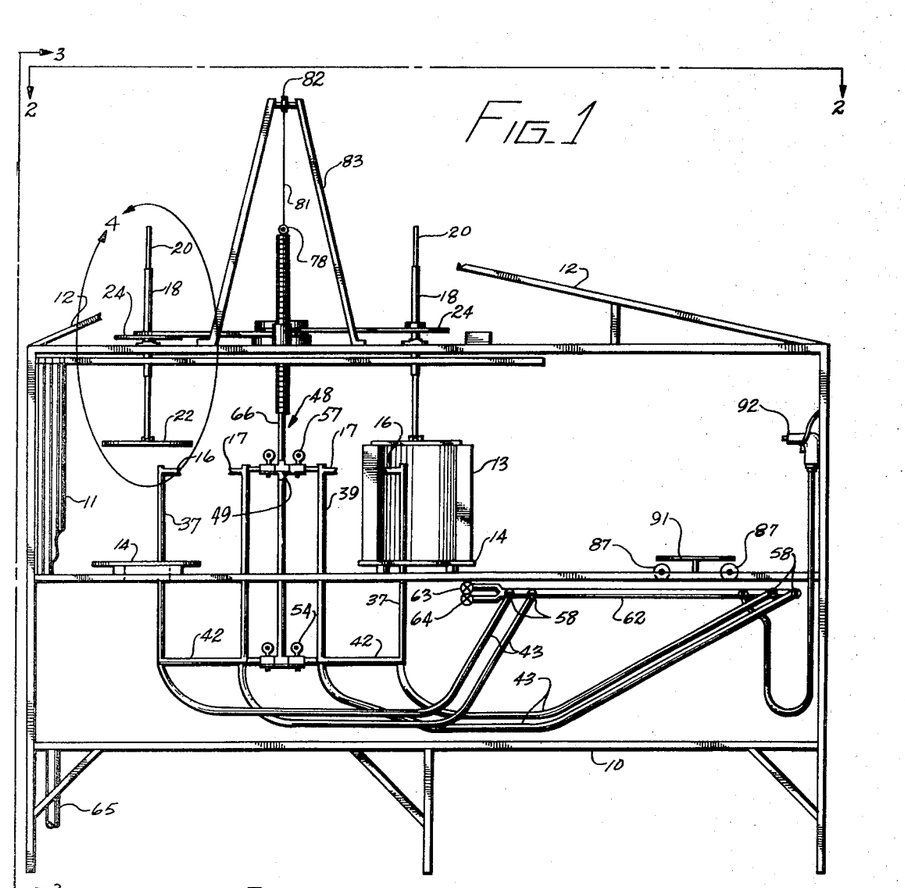
FIG. 1 is a front view of a filter washing apparatus constructed according to principles of this invention, with side panels removed to better illustrate the internal mechanisms.
Figure 2:
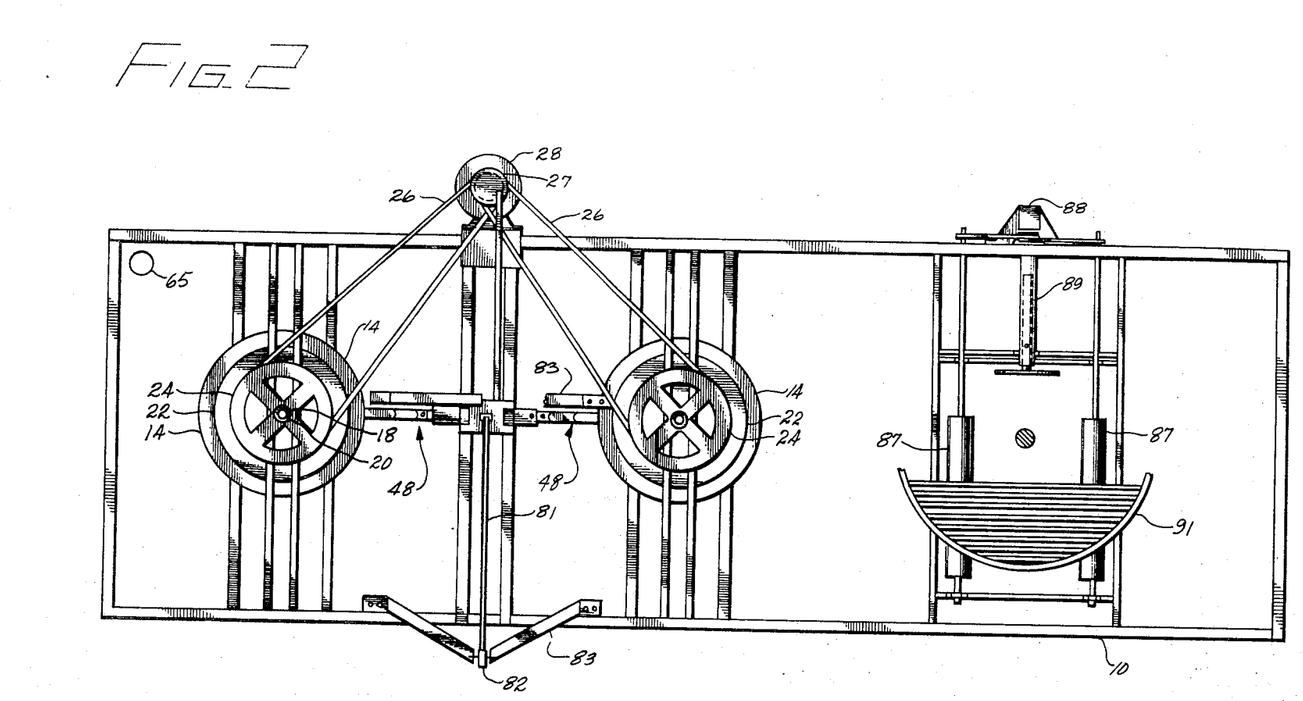
FIG. 2 is a top view of the apparatus of FIG. 1.
Figure 3:
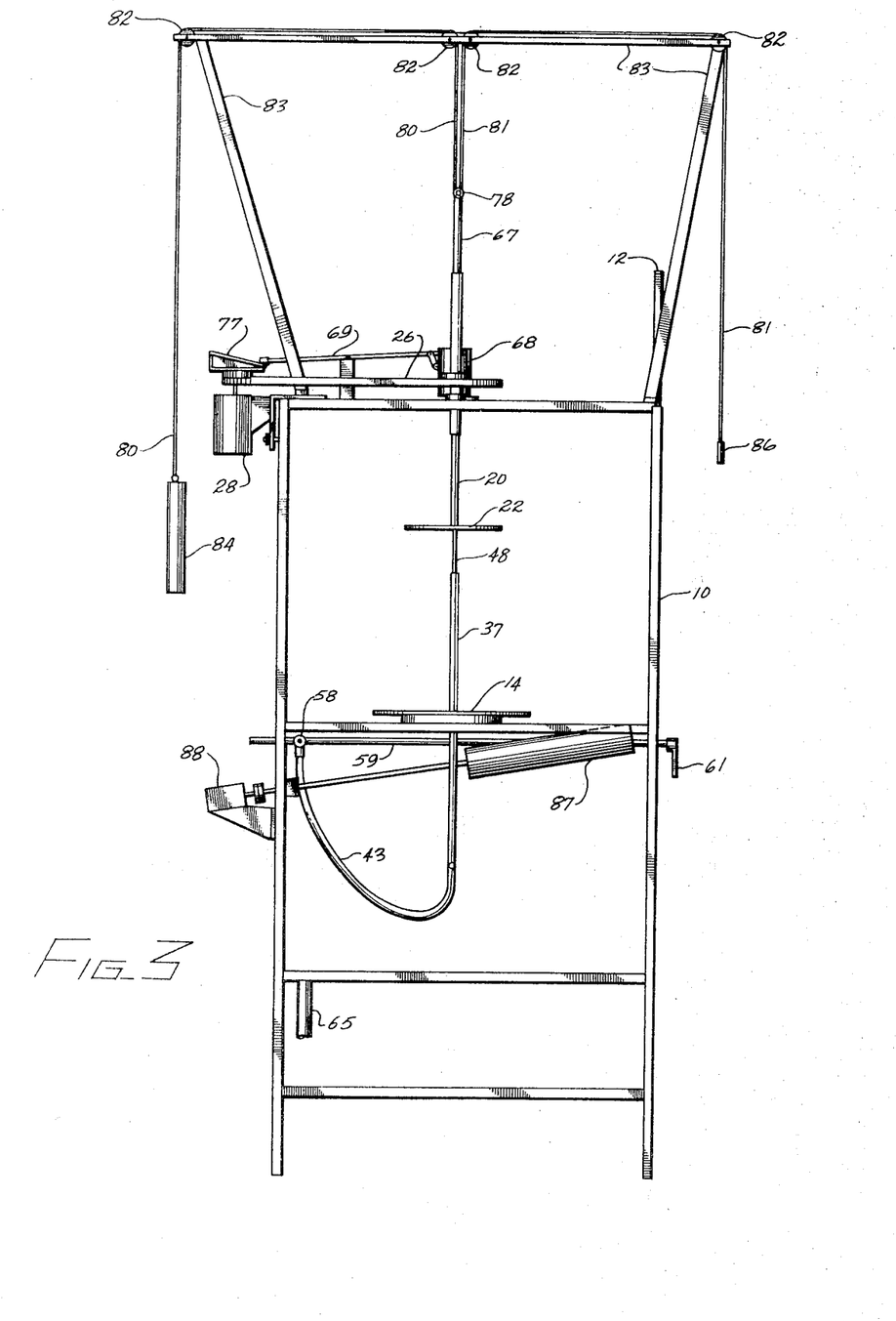
FIG. 3 is an end view of the apparatus of FIG. 1.
Figure 4:
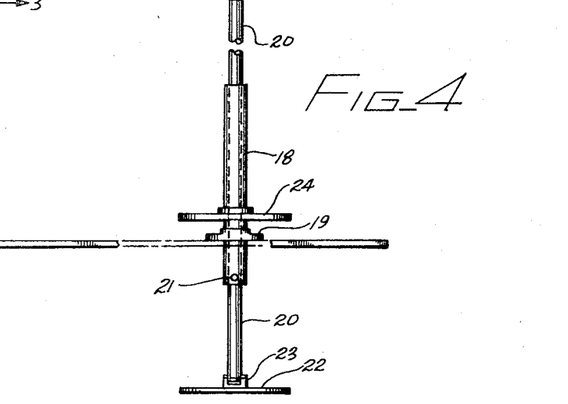
FIG. 4 is a detail of means for holding an air filter in position and rotating it about a vertical axis.

FIGS. 1, 2 and 3 illustrate in front, top and end views, respectively, an air filter washing apparatus constructed according to principles of this invention. In these drawings sheet metal panels surrounding and forming sides of the apparatus have been deleted in order to illustrate the operating mechanisms and it will be apparent that any appropriate paneling, shielding and the like can be provided to contain water and cleaning solutions sprayed about within the apparatus. The omitted metal side panels are connected to an apparatus frame 10 which is conveniently welded together from angle iron and the like. A slidable transparent curtain 11 is provided across an open front portion of the apparatus so that it can be pushed to one side for loading and unloading filters and drawn across the front of the apparatus during use to prevent splashing water from leaving the apparatus. Any other closure desired may be used, such as doors or the like. A truss-like stiffening frame 12 is provided over the top of the broad front opening of the apparatus since this portion of the top is not sufficiently supported by the sheet metal sides.

Rather generally speaking, an air filter element 13 is mounted with its axis vertical on a horizontal turntable 14 so that the hollow cylindrical air filter can be rotated about the vertical axis. In FIG. 1 an air filter element 13 is illustrated in cross section on one of the two turntables 14. An inside spray nozzle 16 and an outside spray nozzle 17 are arranged opposite each other on opposite sides of the wall of the air filter 13 so that spray from the nozzles 16 and 17 impinges on both the inside and outside surfaces, respectively, of the air filter while it is rotating on the turntable 14. The spray nozzles 16 and 17 are mounted for vertical translation so that during normal operation spraying is commenced at the top of the filter and progressively the spray nozzles traverse downwardly along the filter to spray the entire length with a cleaning solution or rinse water.

The filter is caused to rotate by a motor driven clamping mechanism best seen in FIGS. 1 and 3. This mechanism includes a sleeve 18 mounted in a bearing 19 on the top of the cabinet of the washing apparatus directly above each turntable 14. A shaft 20 is mounted within the sleeve 18 for vertical translation and is held in position by a set screw 21 is preferably provided with a T handle (not shown) or the like so that it can be readily and quickly released and tightened. On the lower end of the shaft 20 a broad, stiff circular rubber pad 22 is mounted by a transverse pin 23 so that the pad 22 has some ability to tilt.

A pulley 24 is fixed to the sleeve 18 and a conventional drive belt 26 extends between the pulley 24 and a pulley 27 on a drive motor 28. In a preferred arrangement a pair of washing stations are provided and two such holding and driving mechanisms are provided as is readily seen in the top view of FIG. 2.

During operation, the motor 28 rotates thereby driving the pulley 24 which is fixed to the sleeve 18. Rotation of the sleeve also rotates the shaft 20 when the set screw 21 is tightened, and the rubber pad 22 is thereby rotated for engaging the top of a filter 13 on the turntable 14 so that the filter and turntable are thereby rotated. By providing the drive at the top and an idler turntable at the bottom, problems of water in the drive mechanisms are avoided.

It is preferred that the inside and outside spray nozzles 16 and 17 each of the type providing a fan-shaped spray 36 arranged to provide an area of spray impingement on the air filter element about one-fourth to one-half inch wide and extending 2 or 3 inches along the length of the filter. Each spray nozzle is about 2 inches from the surface of the filter element. Such a spray arrangement does an excellent job of cleaning within the longitudinal pleats of the filter and provides a high pressure jetting action which readily removes dust, dirt and the like from the filter. By providing a fan-shaped spray from each nozzle an appreciable length of the air filter element is washed at all times so that as the sprays progressively move along the length of the filter, each increment of length is within the area of spray impringement several times. The length being washed is still short compared with the length of the filter element so that a hard jetting action is obtained. Previous apparatus employing fixed sprays for the entire length do not have enough force for washing very dirty filter elements.

The inner spray nozzle 16 is mounted on the upper end of a vertical pipe 37. Similarly, the outside spray nozzle 17 is at the upper end of a vertical pipe 39. The pipes 37 and 39 are interconnected by a horizontal bar or plugged pipe 42 so as to be held a fixed distance apart. Flexible hoses 43 (FIG. 1) are connected to the pipes at each washing station for supplying water or cleaning solution to the spray nozzles 16 and 17.

In the washing of air filter elements, several different sizes may be encountered, and it is desirable to independently adjust the positions of the inside spray nozzle 16 and outside spray nozzle 17 so that the force and areas of the impinging sprays can be selected. The mounting arrangement permits the radial position of the spray nozzles relative to the turnable 14 to be adjusted.

As mentioned briefly hereinabove, the spray nozzles are supplied with cleaning or rinsing solutions through flexible hoses 43. The hoses have sufficient length to accommodate vertical translation of the spray bars during operation of machine as hereinafter described, and their opposite ends are connected to a series of quarter-turn valves 58 positioned at the rear of the filter washing apparatus. An elongated bar 59 (FIG. 3) extends from each valve 58 to a handle 61 at the front of the apparatus for manual operation. It is preferred to employ valves 58 at the rear of the apparatus since after prolonged use some leakage of these valves may occur and can be tolerated since it does not strike the operator in front of the machine. The several valves 58 are connected to a fluid manifold 62 which is, in turn, connected to a cold clear water valve 63 for rinsing and a hot soapy water valve 64 for washing filters. The selection of hot and cold water is controlled by the manual valves 63 and 64 to which cold water and hot soapy water are provided in a conventional manner. The supply valves 63 and 64 are also preferably at the rear of the apparatus and operated from the front to protect the operator. It is of more interest that these manifold valves be at the back since these are the ones found to leak more often. A drain 65 in the pan at the bottom of the apparatus carries dirty water to waste.

In order to translate the spray bar assembly 48 in a vertical direction, a rod 66 is connected to the upper end of the pipes 42 and the upper end of the rod 66 is connected to a linear ratchet 67. A conventional ratchet operator 68 mounted on the top of the filter washing apparatus provides support for the ratchet and the spray bar arrangement connected thereto. A very simple ratchet and ratchet operator has been found to be a conventional automobile bumper jack operated in its conventional manner.

In order to operate the ratchet, a rod 69 is connected to the operating lever of the jack. Mounted on the top of the pulley 27 connected to the motor 28 that drives the turntables there is a circular hoop 77 in a plane tilted relative to a normal to the motor axis. In this way, as the motor causes the pulleys 27 to rotate, the hoop 77 also rotates, making the end of the rod 69 rise and fall once for each revolution of the hoop. This rise and fall is translated to the operating lever of the ratchet operator 68 and the ratchet is thereby lowered one tooth-length each revolution of the motor. In a typical embodiment, the filter element is rotated at a rate of one revolution every 10 seconds and the spray heads drop approximately 1 inch per three revolutions.

It has been found that the reason that air filters lose their ability to pass substantial quantities of air as washings are repeated lies in gradual blocking of the pores in the paper by very fine particles. Most air filters of the type involved in practice of this invention, are employed in trucks or construction equipment operating in environments where motor oil and exhaust fumes are present. Apparently oils, unburned hydrocarbons, and the detergents in the motor oil accumulate in the paper filter element during operation. This is believed to produce a surface that has a high affinity for small particles and does not readily yield these particles under normal cleaning operations. Thus, as time progresses, the oils and associated particles accumulate in the filter until it is effectively plugged. It is believed that the relatively coarse particles seen on the surfaces of a dirty filter are of appreciably less significance in blocking air passage through the filter than are the fine particles trapped in the pores of the filter paper by the oils and detergents.

In a cleaning apparatus as illustrated in FIGS. 1–3, the washing and rinsing nozzles are opposed to each other so that the force of cleaning liquid impinging on the surfaces of the filter paper are approximately balanced. For this reason, a relatively small quantity of cleaning liquid actually flows through the filter in the course of the cleaning operation. It has been found to be far superior for cleaning filters to employ an arrangement where at least a portion of cleaning liquid is forced through the filter paper so as to dislodge the oils and particles contained within the fine pores thereof.

Since the fine particles are to some extent retained by the oils, detergents and unburned hydrocarbons within the filter, it is found to be particularly effective to saturate the paper filter membrane with hot soapy water for dislodging the oils and particles. According to one technique, hot soapy water is forced through the filter paper by impingement or pressure so that flow through the paper assures saturation. According to another technique, the hot soapy water is applied to the paper for soaking while spinning a filter about a vertical axis or rotating it more slowly about a substantially horizontal axis. This is followed by a clear rinse that is forced to flow through the paper for dislodging the soapy liquid and the oils and dirt within the paper. By soapy liquid it is not intended to refer only to soaps, but also to detergent solutions that may be effective in removing oils, unburned hydrocarbons and dirt.

The effectiveness of the cleaning technique where the cleaning liquid is forced through the filter membrane is shown in a very surprising manner. The efficacy of cleaning wherein cleaning liquid is forced to flow through the filter membrane is substantially the same whether the flow is from the dirty side towards the clean side or from the clean side towards the dirty side. Thus, it is found that the critical feature is flow through the paper filter and not necessarily back-flushing through the filter.

Thus, for example, when a dirty filter has hot soapy water forced through it from the dirty side toward the clean side, substantially clean water flows through for a few seconds. Thereafter the water flowing through the filter is visibly dirty and once this occurs, it appears certain that the hot soapy water has soaked into the pores where dirt is entrapped. Thereafter forcing of additional soapy water or cold clear rinse water through the paper is effective in substantially completely restoring the filter to its original condition. One such filter soaked with hot soapy water and rinsed with cold clear water, at least one of which was forced to flow through the filter paper, has been cleaned and re-used 16 times without noticeable deterioration in the ability to pass air.

Figure 5:
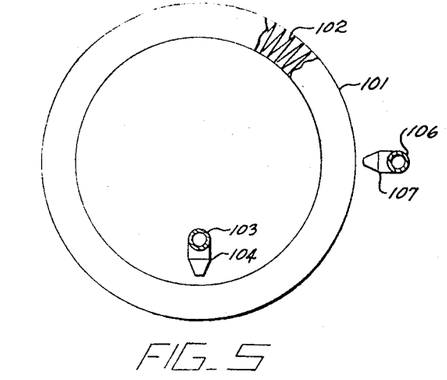
FIG. 5 illustrates another alignment of nozzles in a filter washing apparatus.

FIG. 5 illustrates semi-schematically a nozzle arrangement for forcing cleaning liquid to pass through the paper filter element. Thus, as illustrated in this embodiment, a filter 101 of the cylindrical canister type is seen in end view. A small portion is cut away to illustrate the accordian folded pleats of the paper filter membrane 102. An inside pipe 103 supports a nozzle 104 directed towards the inside of the filter 101. On the outside of the filter a second pipe 106 supports a nozzle 107 directed towards the outside of the filter. The two nozzles 104 and 107 are displaced from each other around the circumference of the filter so that the sprays from the nozzles each impinge on different areas of the filter. Preferably, each of the nozzles is of a type giving an aerated spray preferably in a general fan shape so as to best impinge within the pleats of the filter paper 102. Typically, aerated water has entrained bubbles of air so that the water is a substantially continuous phase and the bubbles are discontinuous. This is to be distinguished from a jet spray of water which is either a continuous stream of water without bubbles of air or is in the form of discrete droplets of water wherein air would be the substantially continuous phase and the droplets would be discontinuous. Conventional aerating nozzles such as very commonly used in kitchen faucets, and the like, have proved suitable.

Figures 6, 7:
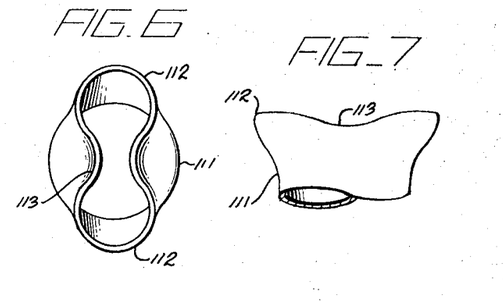
FIGS. 6 and 7 illustrate in end and side views a form of nozzle useful for cleaning and inspecting air filters.

Another inexpensive nozzle that has proved particularly suitable for thorough cleaning of air filters is illustrated in FIGS. 6 and 7 which comprise end and side views, respectively, of the very simple nozzle. Typically such a nozzle is formed by merely pinching the end of a piece of copper tubing 111. The end is pinched from two sides so that the tubing collapses towards a general figure 8 shape transverse to the direction of fluid flow, as seen end on in FIG. 6. The pinching causes the tube to bulge slightly in a direction transverse to the direction of pinching so that the pinched end has a pair of slightly bulging lobes 112 separated by a narrowed waist 113. In a typical embodiment, the waist 113 has an inside width about one-third or less of the inside diameter of the tubing 111. A nozzle formed in this manner provides a fan-shaped spray with an included angle of about 20°–25°. It is believed that the velocity of flow near the center of the fan-shaped spray is higher than near the edge and that in the region near the nozzle air is entrained to some degree in the water so that the water can be considered to be aerated, even though not so much so as with a conventional aerating nozzle such as employed in kitchen sinks and the like. If desired, air can be injected in the water stream a considerable distance upstream from the nozzle.

In order to loosen oils, unburned hydrocarbons and the like that trap dirt within the pores of the filter paper, the paper is saturated with soapy water. One technique that has been employed satisfactorily is simply to lay the filter on its side on the substantially horizontal rollers 87 in the apparatus illustrated in FIGS. 1 to 3 and add hot soapy water to the interior. The soapy water soaks into the paper as it is slowly rotated and drips from the outside. At first the water coming through is clear and subsequently it becomes dirty, indicating the saturation of the paper has occurred and some of the dirt is being dislodged. The filter can then be rinsed by forcing water against the surface so as to flow through the filter paper membrane, thereby dislodging the soapy water and the oils and dirt in the paper.

Still another way of applying the hot soapy water is with the filter arranged vertically and on a turntable that permits rotation at a sufficient speed to force water through the paper. According to this technique the filter is arranged with its axis vertical and rotated about this axis while hot soapy liquid is applied on the interior either along substantially the entire length of the filter or at least near the top portion from whence it can flow downwardly. The filter is rotated at a speed such that the acceleration is at least 1 g, that is, the centripetal acceleration is equal to or greater than the acceleration of gravity. Thus, the hot soapy water is forced to flow through the filter paper membrane with a force that is at least equal to that when the hot soapy water is added in a filter lying in a horizontal position.

As one example, a 12-inch-diameter filter is rotated at about 100 rpm which gives an acceleration of 1.7 g, and it is observed that a greater flow of hot soapy water occurs through the spinning filter than through one lying substantially horizontally with water flowing through due solely to gravity. When hot soapy water is soaked into the filter paper while the filter is spinning, somewhat faster saturation is obtained and it may also be that there is more thorough saturation.

Referring again to FIGS. 1 and 3, an eye 78 on the top of the linear ratchet 67 is connected to a pair of cables 80 and 81 which are lead over pulley 82 supported on a frame 83 above the main body of the washing apparatus so as to hang down behind and in front of the apparatus, respectively (the rear portion of the frame 83 and cable 80 are deleted from FIG. 2 for clarity of underlying parts). A counterweight 84 is connected to the rear cable 80 for counterbalancing a principal portion of the weight of the spray bar assembly at the air filter washing stations. The weight 84 is less than the full weight of the spray bar assembly so that it is biased downwardly by gravity. The other cable 81 depending in front of the apparatus has a handle 86 for use by the machine operator.

At the start of a washing cycle, the operator pulls downwardly on the handle 86 which raises the linear ratchet 67 in the ratchet operator 68 and brings the entire spray assembly to the top part of the filter. When the handle 86 is released, while the motor 28 is running, the ratchet gradually and progressively lowers the spray assembly so that the spray nozzles 16 and 17 progress downwardly along the extent of the filter for thorough cleaning of the entire length.

In the normal course of operation of the apparatus, a filter element 13 is placed on one or both of the turntables 14 and the rubber pad 22 is lowered into position to firmly hold the filter element in place. Thereupon, the set screw 21 is tightened for holding the pad down and causing the shaft 19 to rotate with the sleeve 18. The curtain 11 is then closed and the motor 28 started so that the filter element commences to rotate as driven by the belts 26. The operator then turns on the hot soapy water or other cleaning solution to the inside and outside sprays. The filter is rotated a few revolutions with the sprays at the bottom. He then pulls on the handle 86 to raise the ratchet 67 and spray bar assembly to a point where the spray nozzles are adjacent the top of the filter element mounted on the turntable. It has been preferred to manually hold the spray assembly in position at the top for a brief interval since it is usual that the ends of the filter element are the dirtiest and a slightly longer cleaning time is desirable. Also, the ends are the most likely to have a leak and slightly prolonged inspection is desirable in a manner described hereinafter.

After a brief dwell at the top, the handle 86 is released and the ratchet, as actuated by the hoop 77 and rod 69, progressively lowers the spray assembly along the length of the filter. When this assembly reaches the bottom it is permitted to dwell for a short period to provide additional cleaning action at the lower end of the filter, and then the operator turns off the hot soapy water and applies cold clear water as a rinse. The handle 86 is again pull to raise the ratchet and spray assembly to the top and the ratchet is then again permitted to lower the assembly along the length of the filter. A dwell is not employed at the top during the rinsing operation. When the spray assembly reaches the bottom in the rinsing operation, the rinse water and the motor 28 are turned off and the pad 22 released so that the filter elements can be removed from the turntables. For particularly dusty filters, a cold rinse can be used prior to the hot washing cycle if desired.

When aerated water is forced to flow through a filter a sound filter paper membrane permits the water to percolate through and heavy flow can be seen on the opposite side. Air entrained in the water is either diverted on the side where the nozzle is, or, there is good reason to believe, a substantial portion of the air also passes through the filter in sufficiently fine dispersed streams or bubbles that no visible bubbles are seen on the far side from the nozzle. Thus, in a sound filter it appears to the observer that only water is passing through.

If, on the other hand, there is a small hole or tear in the filter paper membrane, the flow of air is relatively unrestricted and a stream of bubbles immediately appears at the location of the hole. It has been found that this flow of air bubbles through the filter paper provides a very sensitive and reliable test for holes and tears, even those sufficiently small that they are difficult to find by conventional light inspection techniques. Holes adjacent the ends of the filter where light inspection techniques are not suitable, are also found with facility by forcing aerated air against the filter element with sufficient force that a substantial amount of water is forced through the paper.

A particular advantage arises from the detection of holes and tears by forceful flow of aerated water since both cleaning and inspection can be combined in a single operation. Thus, when the machine operator permits the nozzles to dwell at the bottom of the filter immediate indication of a leak adjacent that end is given. Similarly, during the dwell at the top, any leak in that region is immediately seen. Since these tests are at the very beginning of the cleaning cycle, any filter that shows the presence of pin holes or tears can be immediately withdrawn from the cleaning cycle and discarded, thereby saving the additional expenditure of time required to clean the filter before inspection.

It will also be noted that inspection of the entire filter paper is obtained both during the initial cleaning cycle and also during the rinsing cycle so that the changes of overlooking a pin hole or tear are significantly reduced. It should also be noted that in the embodiment illustrated in FIG. 5, the inside nozzle 104 is preferably arranged so as to be directed towards the front of the apparatus to afford the fullest view by the machine operator. By having the nozzles directed to different portions of the filter membrane, it is also found that other filter defects can be detected. Thus, for example, if the filter has been used where it can accumulate cement dust, it may become permanently plugged so that air cannot flow freely therethrough. This condition can be readily observed by merely noting the quantity of water flowing through the filter from the nozzle 104 impinging on the inside. Since the nozzles on the inside and outside are not directed towards each other, a substantial pressure gradient is produced across the filter membrane and weak filters that might rupture during use are detected since they rupture during cleaning. It will be noted that a wet filter during the washing operation is not as strong as the dry filter actually put into service. Thus, it will be seen that during the cleaning operation, quick and reliable pressure, flow rate, and leak inspection is obtained.

When the air filter element is removed from the table 14 it is placed on a pair of parallel rollers 87 (FIGS. 2 and 3) which are rotated by a motor 88 at the rear of the apparatus. The rollers 87 are tilted so the forward ends are higher than the rearward ends and an adjustable stop 89 is provided behind the sloping rollers to keep the air filter element from sliding too far rearwardly. While in place on the rollers 87, the air filter element is manually inspected for tears, breaks or holes in the paper which would pass dust to the engine. If upon manual inspection a remaining dirty area is noted, a circular removable grill 91 which can conveniently be an ordinary barbecue grill is placed in position over the rollers 87 so that the air filter element can be set thereon and spot cleaned with a hand-operated nozzle 92. This grill is also useful for manual cleaning of the approximately 4% of existing filter types that do not provide access for a central spray nozzle and are, therefore, usually cleaned manually.

The hand operated nozzle 92 is employed for inspection as well as spot cleaning of the filters after the automatic cleaning steps. The hand nozzle is preferably a pistol grip type of unit with a hand-operated valve and has a large forceful flow of water heavily aerated with entrained bubbles of air. This is to be contrasted with a fine needle-like spray or a single hard jet of water. A forceful flow of relatively large volume is desired in order to force water through any apertures in the filter and also to effect spot cleaning where required. The heavy aeration to provide a large number of bubbles within the flow of water is desired for inspection purposes.

Inspection with the hand nozzle 92 is normally conducted in three stages. The first stage involves forward flow of water from the dirty side of the filter towards the clean side, that is, with the flow of water from the hand nozzle impinging on the normally dirty side of the filter. The water coming through to the normally clean side of the filter should be clear to indicate an adequately clean filter. The second stage of testing is a reverse flush where the stream of water from the hand nozzle is directed against the normally clean side of the filter and the water on the normally dirty side should also be clear to indicate proper cleaning.

The third stage of testing is to test for tears, separations in the bond, or the like, at the ends of the filter. This is of particular importance since in the normal course of testing the filters by viewing them in intense light, leaks at the ends can easily be overlooked or not seen at all under the best of conditions. In visual inspection any obvious holes in the filter element can be seen by the operator when the filter element is illuminated with bright light from one side and any tears, perforations, or the like, show up as a bright spot. Leaks at the ends of the filter are common since at the ends the paper filter element is sealed to the metal ends and this seal can be broken if the filter element is dropped or if the filter has been used under adverse conditions that may cause cracking of the sealing material. Sometimes poorly sealed areas are found due to manufacturers' faults and in other instances the seal separates from the metal ends in use. Such leakage at the ends is not readily determined with light inspection.

In order to find the end leaks, the filter is laid on the rollers 87 and the hand gun 92 with a full flow of aerated water is held in one position to direct the flow against the filter element as the filter rotates. In a sound filter having no holes, tears or perforations, the wet paper forming the filtering material prevents the passage of air due to the surface tension forces of the liquid within the porous paper. Water may flow through the porous paper but air will not when it is wet. If, on the other hand, there is a hole, the force of aerated water against the paper causes bubbles of air to pass through the hole and these bubbles are readily seen on the reverse side of the filter. Thus, as the hand nozzle scans around the end of the filter rotating on the rollers, the heavily aerated forceful flow of water passes water through a sound filter but causes a stream of air bubbles within the water to be seen at any leaks through the filter. This has been found to be an excellent inspection technique for identifying filters having leaky elements.

By using an aerated flow of water against the filter after cleaning in the automatic station, any leaks in the filter can be detected at an early stage before all of the cleaning operations have been completed. After washing the filters in the disclosed apparatus they are dried for many hours at low temperature in a forced drying oven for complete drying without damaging the resins in the paper. After prolonged drying, the filters are inspected with bright lights for holes or tears. By detecting such holes or tears immediately after washing, the filter can be immediately discarded instead of going through the drying and subsequent inspection cycles, thereby effecting a substantial saving of time and effort.

By using aerated flow in the cleaning station, tears, holes, or weak or plugged regions in the paper are detected at an early stage and the additional testing with the hand-held nozzle may be deleted or minimized. It is also found that by forcing liquid to flow through the filter paper that sufficiently good cleaning is obtained in most cases that significant inspection and spot cleaning can be avoided.

Figures 8, 9:
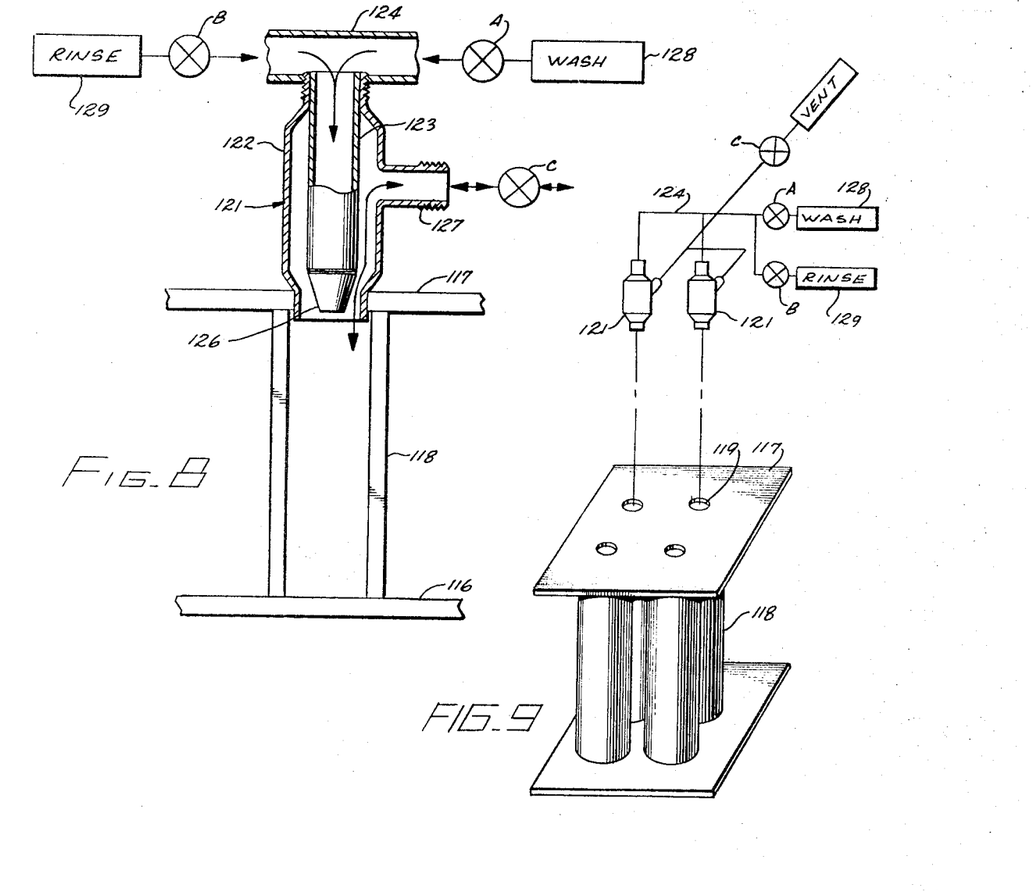
FIG. 8 illustrates semi-schematically an arrangement for cleaning and inspecting another type of air filter element.
FIG. 9 illustrates semi-schematically means for cleaning a plurality of filter elements.

Another type of air filter element is sometimes employed in trucks, earth moving equipment and the like. A filter of this type and apparatus for cleaning such a filter are illustrated semi-schematically in FIGS. 8 and 9. As best seen in FIG. 9, this type of filter is typically rectangular with a plastic layer 116 on one face and a plastic header 117 on the opposite face. Mounted in between the opposed plastic sheets 116 and 117 are a plurality of cylindrical filter elements 118. These filter elements are generally similar to the canister-type filter elements hereinabove described and in a typical embodiment are about 9 inches long and 2 to 2½ inches in diameter. They are formed of pleated paper with the pleats (not shown) about one-fourth inch deep running along the length. One end of each paper filter element 118 is embedded in or sealed to the end plastic layer 116. The opposite end of each filter element is embedded in or sealed to the plastic header 117. A plurality of holes 119 through the header 117 communicate with the interior of each of the paper filter elements 118. From 4 to 64 filter elements are conventionally used in air filters of this type.

When a filter as illustrated in this embodiment is used, the air flow is through the holes 119 into the interior of the separate filter paper tubes 118. The air passes through these filter elements and thence through a surrounding perforated sheet (not shown) en route to the engine. Dirt therefore accumulates on the inside of the tubes rather than on the exterior as is more common in the canister-type filters. Previously there has been difficulty in cleaning this type of filter since the holes 119 are typically about 1 inch in diameter and access by washing nozzles is therefore difficult. The successive cleaning of the separate filter tubes 118 in the assembly is time consuming and has generally proved uneconomical.

It has been found that thorough and economic cleaning of a filter of the type illustrated in FIG. 9 can be accomplished in practice with this invention. The first step of cleaning may be to vacuum the interior of the tubes by placing the inlet of a conventional vacuum cleaner over the holes 119, either individually or in groups. This draws air in a reverse direction through the paper filter elements and the rather large loose dirt that accumulates within the filter elements is largely removed. Effective cleaning has been obtained without this step and it may be deleted in most instances.

The next cleaning step is to thoroughly saturate the paper filter elements with a cleaning liquid which is preferably hot soapy water which loosens the oils, detergents and unburned hydrocarbons within the pores of the filter paper, thereby loosening the fine dirt particles therein. Although this saturation can be obtained by merely filling the cylindrical paper elements with hot soapy water, it is far preferable to employ an aerating nozzle that is pressed into the hole 119 so as to engage the sides and effect a degree of sealing so that the interior of the paper filter elements 118 is slightly pressurized with the aerated liquid. This forces the hot soapy water to flow through the paper filter element and quickly effects saturation and removal of trapped fine dirt particles.

The presence of aeration in the soaping or rinsing liquid is desirable since any perforations, tears, pin holes or the like permit the air bubbles to pass and result in a flow of bubbles on the outside of the filter element which are readily noticed by the operator. If no bubbles are seen, the filter is sound and can be restored to service. The aerated water inspection technique is particularly valuable with a filter of this geometry because visual inspection is extremely difficult.

FIG. 8 illustrates semi-schematically in transverse cross-section an arrangement found to be particularly suitable for cleaning filters of the type illustrated in FIG. 9. Thus, as illustrated in this embodiment, a special nozzle 121 is inserted into the hole 119 through the header 117. This nozzle has a hollow body 122 concentric with an inlet tube 123. The upper end of the tube 123 beyond the body is threaded to fit a manifold 124 indicated only schematically. At its lower end, the body is constricted to fit within the hole 119 through the header 117. The tube 123 which may be either straight or tapered extends down to the constriction and is pinched into a nozzle tip 126 like that illustrated in FIGS. 6 and 7. A threaded side tube 127 communicates with the interior of the body.

A valve A connects the manifold 124 to a supply 128 of washing liquid which is typically hot water containing a suitable soap or detergent. A second valve B connects the manifold to a source 129 of rinsing liquid, such as, for example, clear, cool water. A third valve C is connected to the side tube 127 for selectively closing this tube which otherwise vents to the ambient. The three valves may be manually operated, or preferably are air or vacuum operated for quick response.

For cleaning the filter element 118, a valve C is left open to vent the interior of the body 122 to the outside. First, the valve A to the soapy water supply is opened to admit soapy water through the nozzle tip 126 into the interior of the filter. Since a dirty filter is typically nearly plugged up with dirt, a pressure of about 20 psi is used to avoid rupturing normally sound filter elements. A portion of the water coming through the nozzle tip dislodges heavy dirt that may have accumulated within the filter element and discharges this dirt through the vent valve C. (Because of this, it is often possible to delete the above-mentioned step of vacuuming the filters before cleaning.) Another portion of the hot, soapy water soaks into and through the paper of the filter element. When such dirty water is observed flowing freely from the outside of the filter, it can be assumed that the paper is sufficiently saturated. Typically in most filters, only a few seconds are required to sufficiently saturate the paper. Thereupon, the valve A is closed.

Next, the filter is rinsed by opening the valve B to the source of rinse water. Because some of the dirt has been dislodged in the washing operation, a higher pressure, typically about 40 psi, may be used for the rinse water. Initially, rinse water flows through the vent valve C and through the paper of the filter element. This serves to dislodge additional dirt from within the filter element and discharge it through the vent.

As the rinsing proceeds, the very fine dirt lodged in the paper of the filter element is washed out and more and more water flows through the paper filter element itself. It is found that as the water flowing through the filter and spilling through the vent becomes clear and free of dislodged dirt, the flow out through the vent diminishes and the venturi action of the nozzle tip 126 within the constricted portion of the body 122 begins to draw air in through the vent valve C. Surprisingly, at the same time water may be flowing out of the vent and air flowing in. The result is that the vent, the nozzle body, and the interior of the filter element are filled with aerated water under moderate pressure. If there is a leak in the filter element, this aerated water flows through and provides an excellent indication of the leak as hereinabove described.

When the water flowing from the filter and vent are substantially clean, the vent valve C is closed for 1 or 2 seconds. Since the rinse valve B is still open, the pressure on the aerated water within the filter element increases and any leaks are even more apt to be detected. In addition, the quantity of water flowing through the filter element is observed and permanently plugged filters can be discarded. Since the interior of the filter element is pressurized, a pressure test is also provided for detection of weak filter elements. Sometimes weak filter elements, leaks, and poor flow rate can be detected during the washing or rinsing steps and the filter can be discarded before reaching the inspection step where the vent valve C is closed.

The valve positions during the cleaning and inspection cycles can be summarized in the following table:

| Cycle | Valve A | Valve B | Valve C |
| --- | --- | --- | --- |
| Wash | Open | Closed | Open |
| Rinse | Closed | Open | Open |
| Test | Closed | Open | Closed |

After rinsing with the cold clear water it is preferred to invert the filter assembly and spray the exterior with clear water to wash off any dirt particles that may be on the exterior. After washing, the filters are dried in a low temperature oven in a conventional manner.

It will be noted that with this cleaning arrangement the flow of cleaning liquids is from the dirty side of the filter to the clean side. However, it has been found that with such technique the cleaning is every bit as good as can be obtained with a reverse flush which, because of the geometry of this filter, would be somewhat difficult to obtain.

FIG. 9 illustrates semi-schematically apparatus for automatically cleaning several elements of a filter according to the above-described technique. The larger filters commercially available have the paper elements arranged in rows of four or eight and to increase filter size additional rows are added. The semi-automatic cleaning apparatus therefore has a pair of cleaning heads 123 and if desired additional heads can be coordinated with the illustrated pair. Each of the cleaning heads comprises a nozzle 121 as illustrated in FIG. 8. Each nozzle is tapered at lower end so as to fit into and provide a partial seal on the hole 119 to minimize leakage of water from within the filter elements and thereby maintain a degree of pressurization therein. If desired, a resilient rubber seal (not shown) can be employed on the nozzle to afford a better seal. A spring may be used on each nozzle 121 so that they are individually biased towards the filter to be cleaned so that an entire bank of cleaning heads can be brought down against a filter and all of the cleaning heads can seal against the holes 119 with approximately equal force.

The several cleaning heads 123 are connected to a liquid manifold 124, illustrated only schematically. The manifold is connected to the wash liquid 128 by a valve A. A second valve B connects the manifold to a supply of rinse water 129. To use the semi-automatic cleaning equipment, the pair of cleaning heads 121 is brought down against the filter so that the nozzles close the holes 119 and the valves are operated in the above-described manner for cleaning and inspecting the filter.

It will be apparent that if desired other arrangements of cleaning nozzles for a bank of filter elements can be used, such as groups of four, as may be best suited to a particular cleaning operation. Manual insertion of the pair of nozzles is suitable or automatic arrangements may be employed. Many other modifications and variations of the present invention can be made by one skilled in the art. It is therefore to be understood that within the scope of the appended claims the invention may be practiced other than as specifically described.

What is claimed is:

1. A method for inspecting an air filter or the like having a liquid wettable porous paper membrane and for cleaning fine particles from within pores of the membrane comprising the steps of:
   pressurizing a substantially closed portion of the membrane with hot soapy water with a sufficient pressure to force water through the membrane; and
   pressurizing the substantially closed portion with clear rinse water with a sufficient pressure to force water through the membrane; wherein
   at least one of the pressurizing steps is accomplished with aerated water; and
   observing liquid flowing through the membrane for presence of gas bubbles therein.

2. A method as defined in claim 1 wherein the pressurizing steps are applied to the normally dirty side of the filter.

3. A method of cleaning a filter or the like having a liquid wettable porous membrane consisting of the steps of:
   soaking the filter membrane with soapy water;
   forcing water through the filter membrane to displace soapy water and particles from the pores of the membrane, wherein the step of forcing consists essentially of forcing water through the filter from the normally dirty side to the normally clean side; and
   forcing clear rinse water through the filter for dispersing soapy water therefrom.

4. A method of cleaning a filter as defined in claim 3 further comprising the step of aerating the water before the forcing step.

5. A method of cleaning a filter as defined in claim 3 wherein the step of soaking comprises pressurizing a substantially closed portion of the membrane with soapy water.

6. A method of cleaning a filter as defined in claim 3 comprising the additional step of aerating the soapy water prior to the soaking step, and wherein the soaking step comprises forcing soapy water against one face of the membrane.

7. A method of cleaning a filter as defined in claim 3 wherein the forcing step comprises pressurizing a substantially closed portion of the membrane for forcing water therethrough.

8. A method of cleaning an air filter element or the like having a liquid wettable porous paper membrane comprising the steps of:

spinning the filter about a vertical axis with a speed sufficient to generate a radial acceleration of at least 1 g;

applying soapy water only to the inside of the paper filter membrane, the applying being to at least the top portion of said inside for forcing said soapy water through the filter membrane to displace soapy water and particles to be cleaned from the pores of the membrane; and forcing clear rinse water through the filter membrane to displace soapy water therefrom.

9. A method of cleaning a filter as defined in claim 8 wherein the applying step comprises impinging aerated water directly on the inside face of the filter membrane.

* * * * *